United States Patent Office 3,266,105
Patented August 16, 1966

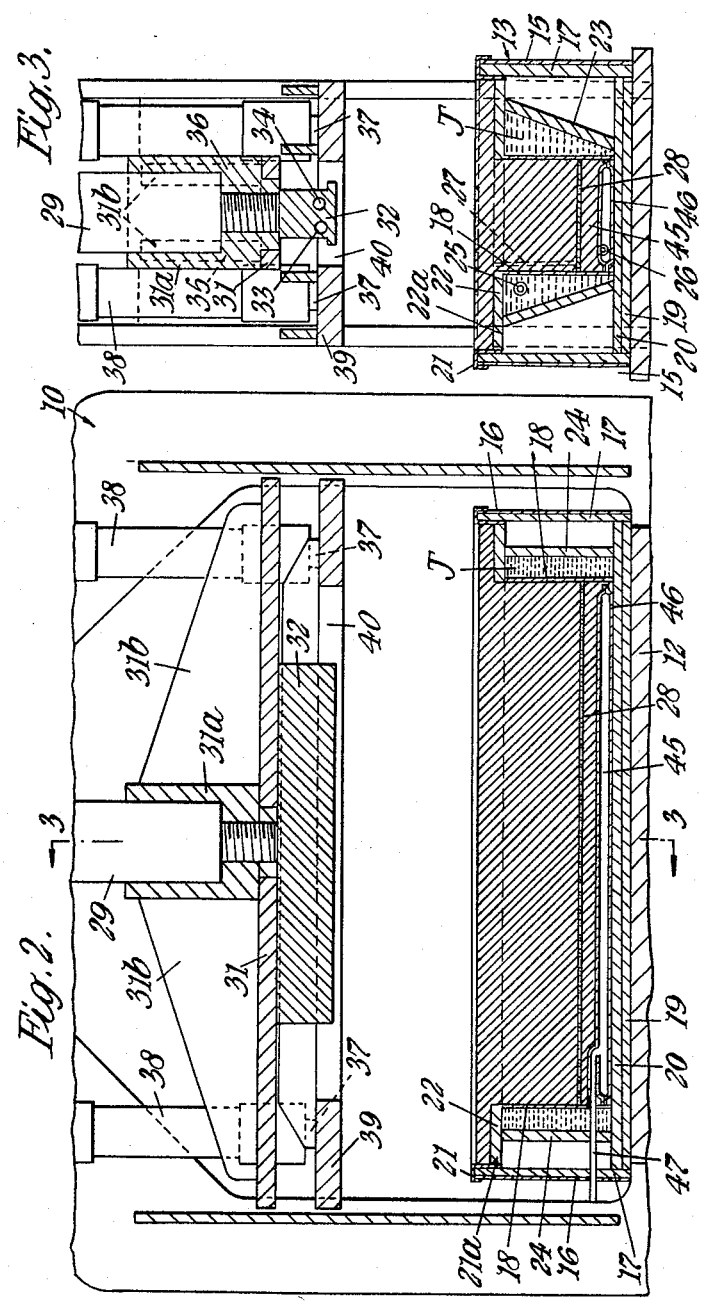

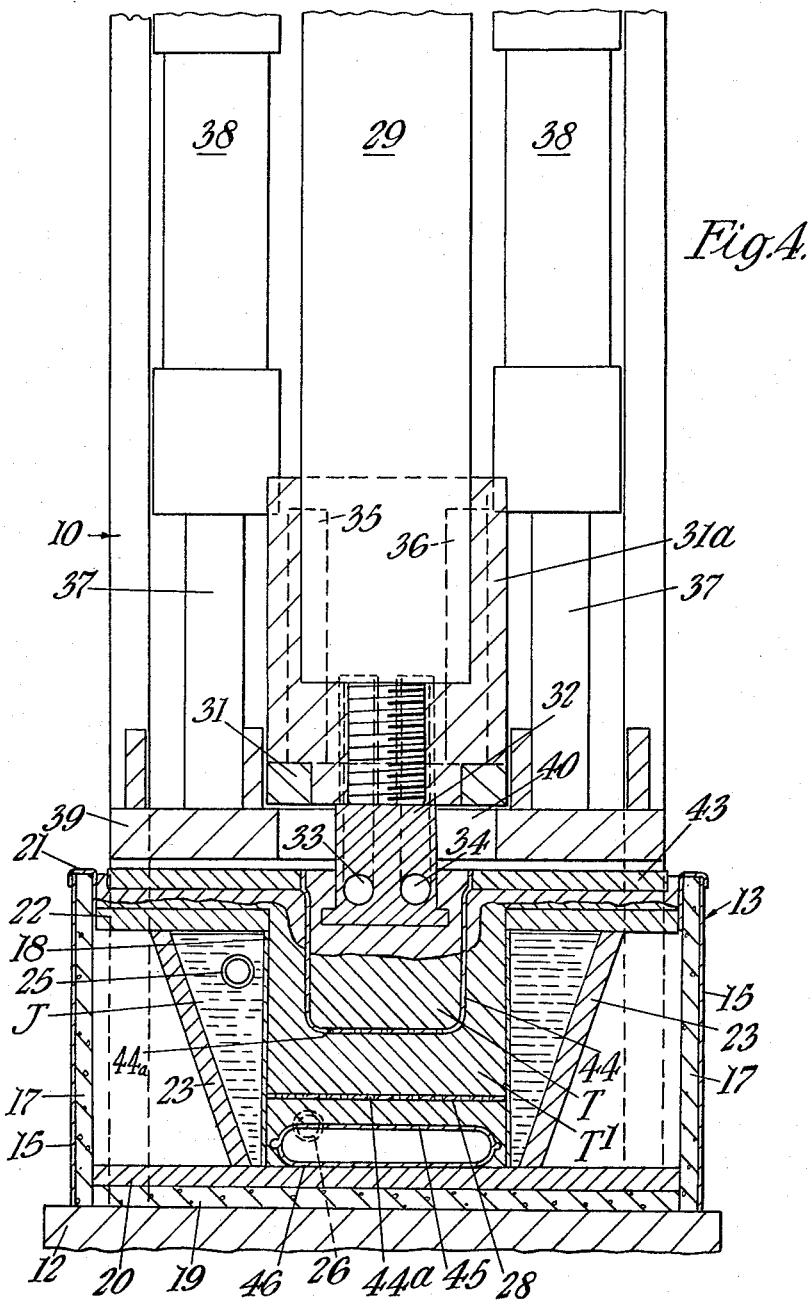

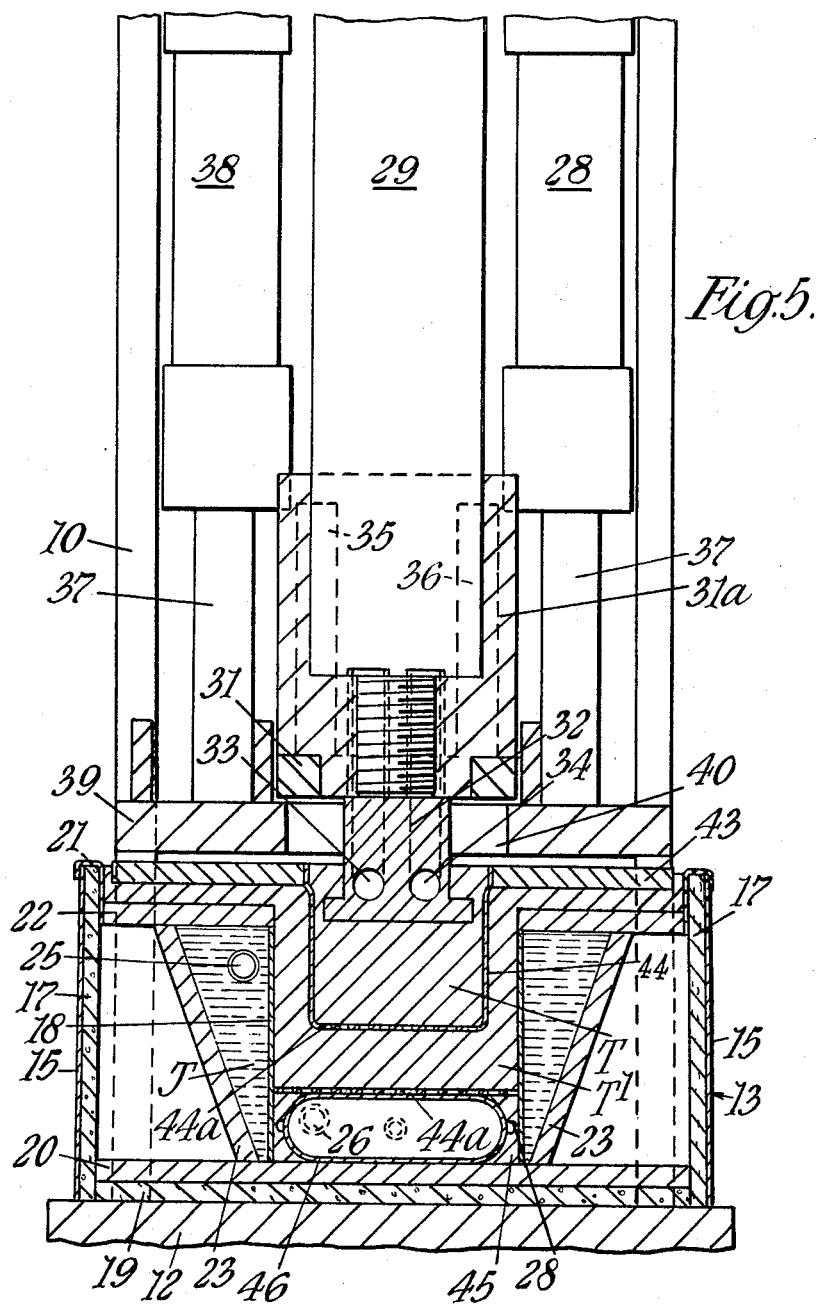

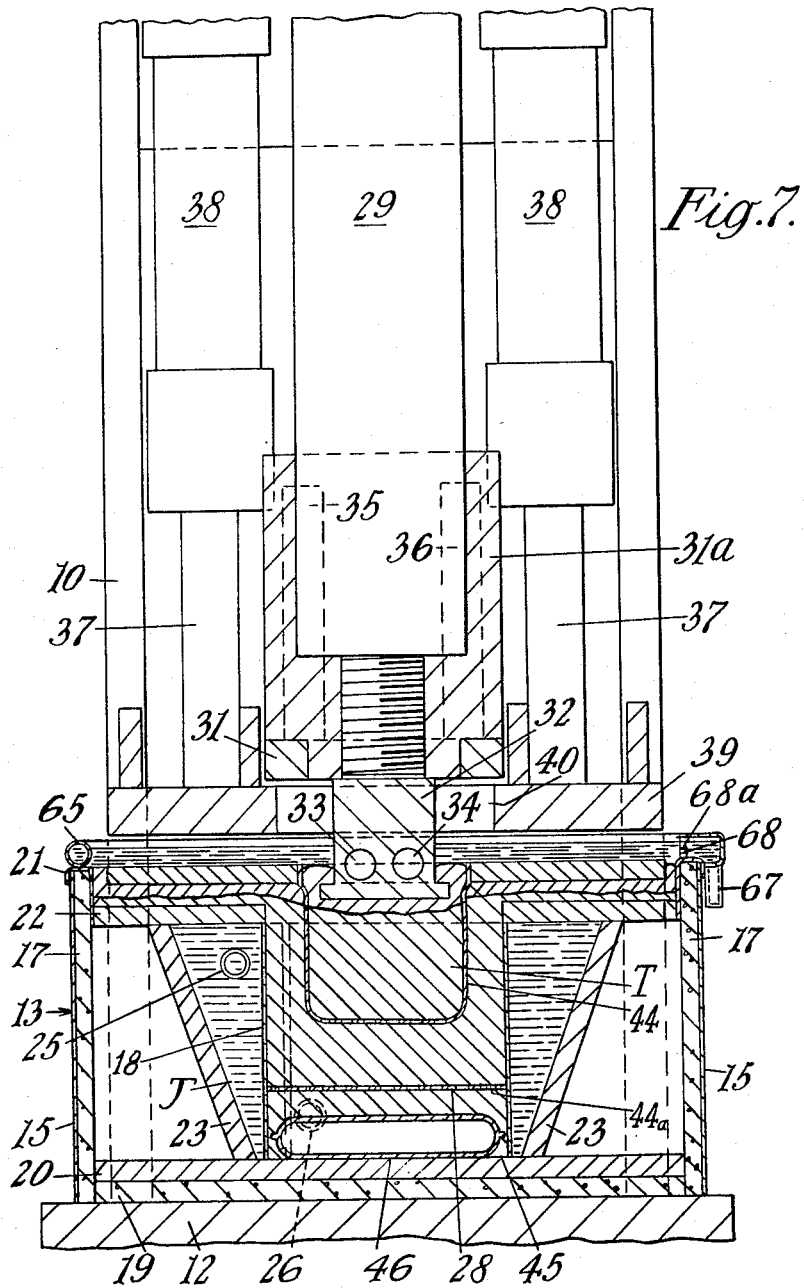

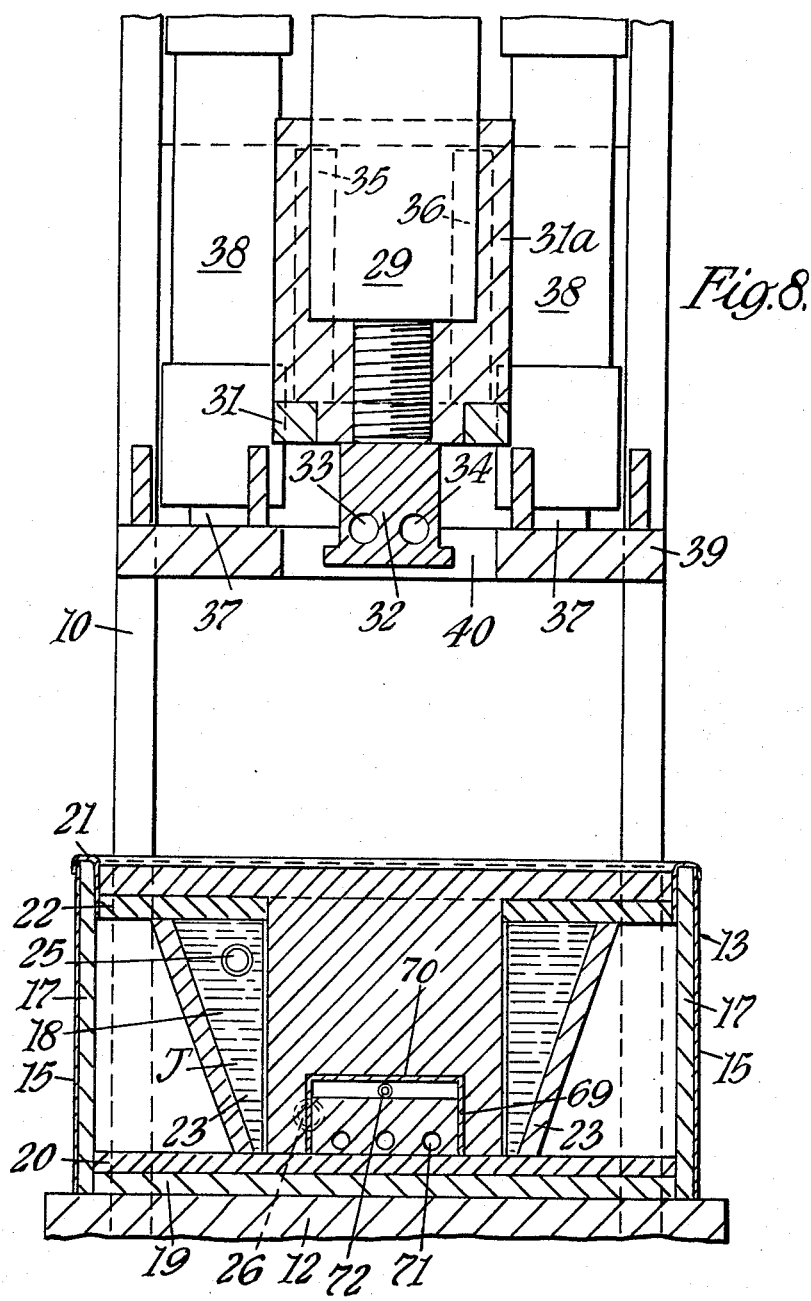

3,266,105
METHOD OF AND PRESS FOR THE MANUFACTURE OF DRAWN SHEET GOODS
John William Lawrence, Rothley, England, assignor to Jewel Engineering (Leicester) Limited, Leicester, England
Filed Apr. 11, 1963, Ser. No. 272,256
Claims priority, application Great Britain, Apr. 24, 1962, 15,463/62
9 Claims. (Cl. 22—67)

This invention relates to the manufacture of hollow dished or like articles which are drawn or stretched to shape from initially flat or substantially flat blanks of sheet material in a press equipped with complementary male and female press tools or dies.

For convenience in this specification such goods will be referred to as "drawn sheet goods."

Thus, whilst the invention is principally intended for application to the production of drawn sheet-metal goods, there is no limitation in this respect as it is also applicable to the production of goods drawn or stretched to shape by complementary press tools from marginally held sheets of leather, plastic, or any other suitable materials.

Heretofore, the matched press tools used in the manufacture of drawn sheet goods have had to be individually produced by skilled tool makers at great expense in the tool room. Thus, manufacturers, and especially smaller manufacturers of drawn sheet goods have previously had to rely on the services of specialist tool makers for the production of press tools which latter have subsequently had to be critically fitted into and on the presses.

The primary object of the present invention is to provide a novel, relatively inexpensive and efficient method of producing the press tools necessary for a manufacturing run of a desired article drawn to shape from sheet material, this method being devised to reduce tool costs to an absolute minimum by dispensing with the services of a skilled toolmaker and also by eliminating the step of fitting the tools to a press.

Broadly considered, the method of this invention consists in forming complementary male and female press tools in situ in their working positions in the actual press which is to be used for producing from sheet material articles corresponding to the form of the said tools.

Advantageously, the said press tools are simultaneously formed by a casting operation, or at least by an operation which is akin to and will hereinafter for convenience be referred to as "casting."

Another object of the invention is to provide a novel form of press for carrying out the above-described method.

With this object in view, the invention also consists in a press comprising in combination, a bed, flask fitted in said bed for containing molten casting material, means for heating and melting material in said flask and means for cooling molten material in the flask, a movable punch platen above and in alignment with the flask, said punch platen being adapted to carry a core-forming element of a male press tool, means adapted to carry a master specimen and locate said specimen within molten casting material in the flask, and means for pressurising the molten casting material remaining in the flask after cooling of said material has commenced.

In order that the invention may be more clearly understood, examples of an hydraulically operated press suitable for carrying out the hereinbefore described method of casting press tools in situ, and examples of particular procedures for putting said method into practice will now be described with reference to the accompanying drawings wherein—

FIGURE 1 is a diagrammatic layout of a complete press and a control console associated therewith, FIGURE 2 is a vertical longitudinal sectional view through the lower portions of the main ram, the punch platen and the flask of the press, said flask being shown full of molten metal alloy in readiness for a tool casting operation but without the original or master specimen and die face plate (which carries said specimen) shown in position therein, FIGURE 3 is a cross-sectional view taken on the line 3—3 of FIGURE 2, FIGURE 4 is a cross-sectional view similar to FIGURE 3 but showing a later stage in the operation of casting a press tool, the original or master specimen and die face plate being in position within the flask, the punch platen being in its lowered position to dispose the core of the male press tool within the molten alloy, cooling and solidification of which has commenced.

FIGURE 5 is a cross-sectional view similar to FIGURE 3 but showing a still later stage in the casting operation, all the molten alloy in both the flask and the original or master specimen now being completely solidified.

FIGURE 7 is a cross-sectional view showing a press having an alternative form of cooling means and FIGURE 8 is a cross-sectional view showing a press in which the flask is provided with an alternative form of means for exerting pressure on the molten material in the flask whilst cooling takes place.

Like parts are designated by similar reference characters throughout the drawings.

Figure 1:
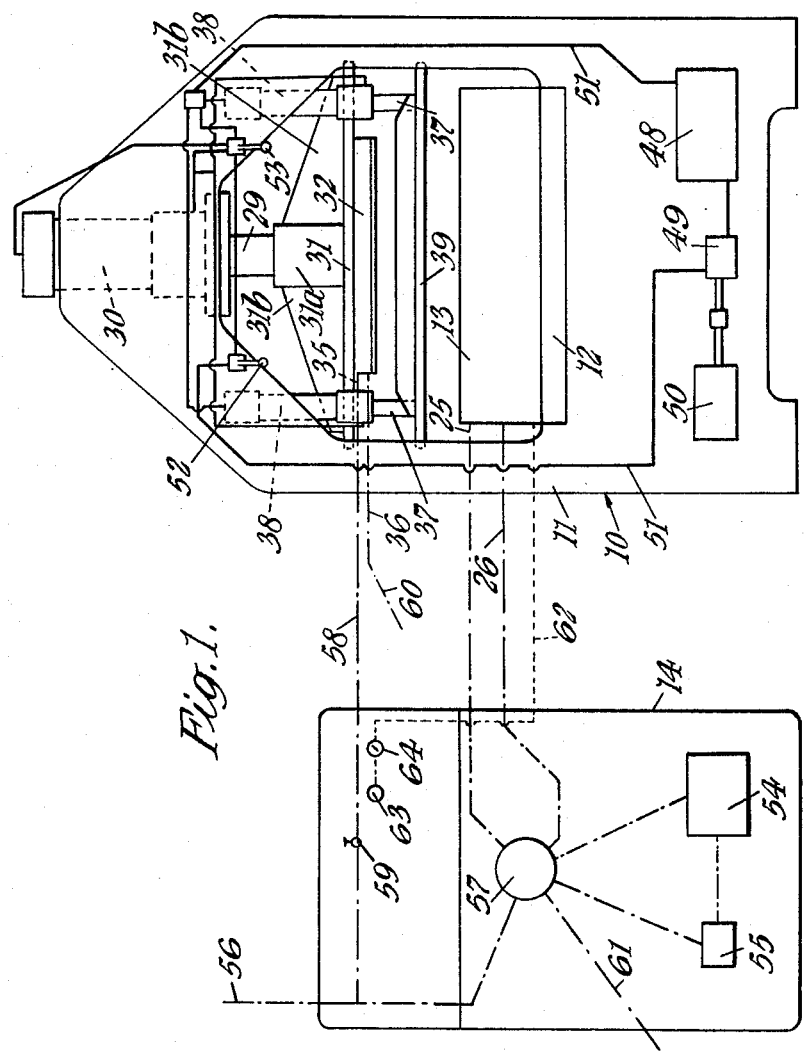

The specific methods hereinafter to be described relate to the casting in situ of a pair of matched and aligned press tools for the ultimate drawing of sheet metal header tanks for vehicle radiators, and in these methods a selected "fusible" bismuth alloy is used in the flask of the hydraulic press. It is, however, to be clearly understood that although the particular following description is limited in these respects, the broad conception of the invention is by no means so limited.

The composition of the selected fusible bismuth alloy in the example now described is 50.0% bismuth, 26.7% lead, 13.3% tin and 10.0% cadmium. This alloy, which it is intended shall be known as and sold under the name "Jewelite," has a melting temperature and a yield temperature both of 158° F., an elongation in 2″ slow loading of 200%, a Brinell hardness of 9.2, an approximate specific heat both when liquid and when solid of .040, and an approximate coefficient of thermal expansion of .000022° C.

The hydraulic press shown in FIGURES 1-6 will now be described. As will be seen, this press comprises a frame 10 which is housed in a casting 11, said frame having a bed 12 on which is mounted a box-like flask 13 for containing the molten bismuth alloy. Provided in association with, and set adjacent to, the press is a control console 14.

The flask 13 which is rectangular in plan, has an outer shell comprising vertical side and end walls 15 and 16 respectively, suitably lined with insulating material 17, and an inner shell 18, also rectangular in plan. The bottom of the outer shell consists of a plate 19 of insulating material secured directly upon the bed 12, whereas the bottom of the inner shell 18 (which largely contains the bismuth alloy) is constituted by a rectangular mild steel plate 20 secured to the insulating plate 19. The upper mouth portion of the insulated outer shell has a metal lining 21 which is turned first outwards and then downwards over the top edges of the flask and the upper end of the inner shell 18 is embraced by a horizontally disposed flange 22 the outer edge 22a of which abuts the lining 21. The space between the outer and inner shells is divided into two by further side and end walls 23, 24 so as to provide around the inner shell 18 a water jacket J. Inlet and outlet pipes 25 and 26 for the circulation of either cold or heated water through the jacket J are fitted in one of the end walls 24 of the latter, said pipes being arranged on opposite sides of a partition 27 which extends across the jacket. Fixed a comparatively short distance above the bottom 20 of the inner shell 18 is a horizontally disposed perforated plate 28.

Above and in line with the centre of the flask 13 is the main ram 29 of the press. The ram cylinder 30 (FIGURE 1) is vertically mounted in the upper part of the frame 10, and to the lower end of the ram there is secured a flat punch platen 31 which is centrally bossed at 31a to fit upon the ram 29 and is also formed with strengthening ribs 31b. The punch platen 31 is arranged to carry a solid cast metal T-bar 32 and this forms the core of the male press tool T to be cast thereupon. The bar has extending through it a pair of parallel passages 33 and 34 communicating with inlet and outlet pipes 35 and 36 whereby cold or hot water can be circulated through said T bar.

Disposed at respectively opposite sides of the main ram 29 are two subsidiary hydraulic rams 37 the vertical cylinders 38 of which are secured in the frame 10. Also, there is secured upon the lower ends of the plungers of said two subsidiary rams 37 a blank holder 39. In this holder there is formed a rectangular opening 40 through which the T bar 32 can protrude downwardly into the flask 13 when the main ram 29 descends in readiness for a tool casting operation.

Figure 6:
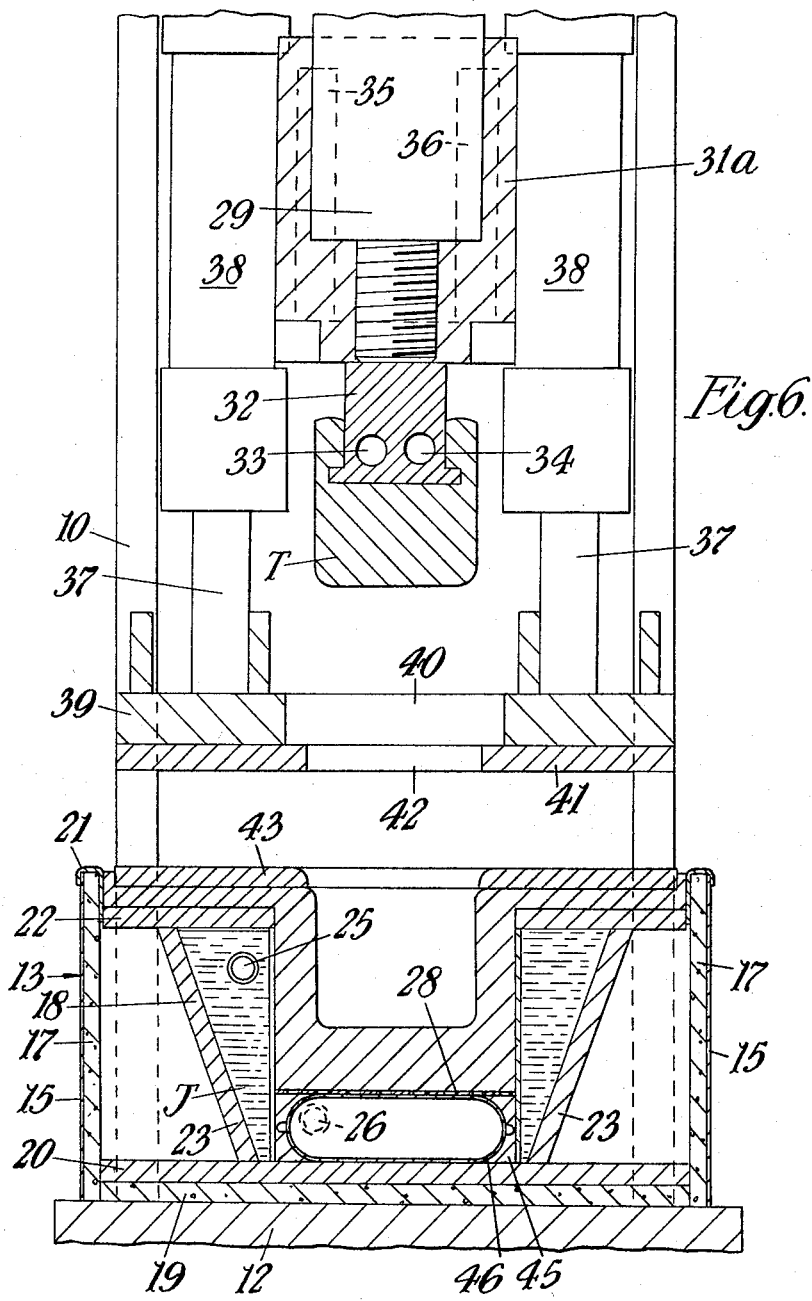
FIGURE 6 is a cross-sectional view showing yet a still later stage in the casting operation, the punch platen now being in its retracted position and the original or master specimen having been removed from the completed cast male press part.

When, however, the press tools have been cast in situ, there is bolted to the underside of the blank holder 39 a blank holder plate 41 which, as shown in FIGURE 6 has provided in it a rectangular opening 42 dimensioned to correspond to the length and width of the cast male press tool T. The latter can then pass through the plate 41 at each downward operative stroke of the ram 29 during a repetition pressing run to produce drawn sheet-metal radiator header tanks or similar article. Thus the opening 40 in the blank holder itself must be of the maximum possible dimensions to permit of the free passage therethrough of the largest possible cast male press tool but since the opening 42 in the plate 41 must closely correspond to the horizontal cross-sectional dimensions of the particular male press tool cast during any one tool casting operation, it will be realised that there will be a different blank holder plate 41 for each manufacturing run.

In any event, the blank holder plate 41 co-operates with a centrally apertured flat die face plate 43 which, in preparation for a tool casting operation, serves to carry the original or master specimen 44 and is initially floated on top of the molten bismuth alloy in the flask 13. When an in situ casting operation is complete, and the original or master specimen 44 is withdrawn together with the cast male press tool T by retraction of the main ram 29, it will be found that the die face plate 43 is "frozen" into position at the top of the solidified bismuth alloy in the flask, where it surrounds the cast female press tool T' and is ready to co-operate with the blank holder plate 41 during subsequent repetition pressing. In doing this, a sheet of metal which is to be pressed will be gripped between the die face plate 43 and the blank holder 41 consequent upon actuation of the subsidiary rams 37 before the main ram 29 presses the sheet to shape in the female tool T'.

As shown in FIGURES 2–7, there is housed in the lower compartment 45 of the inner shell 18 of the flask i.e. in the space beneath the perforated plate 28, an inflatable bag 46 into which, in the particular example now being described, air can be pumped through an air inlet 47. The perforated plate 28, which enables molten bismuth alloy to flow down on to the top of the bag 46, also prevents this bag from floating upwards. Thus, whenever the bag 46 is inflated, as it is in FIGURES 5 and 6, it exerts upward pressure on the molten alloy contained within the flask 13 during cooling, thereby not only compensating for shrinkage of the alloy but also avoiding the occurrence, at least in important locations, of "sinks," "pipes" and cavities normally produced during casting operations.

As depicted diagrammatically in FIGURE 1, there are suitably housed in the bottom of the framework 1 of the press, an oil reservoir 48, an oil pump 49 and an electric motor 50 for driving the said pump. Connected to the pump 49 and reservoir 48 is a circulatory system of piping 51 including suitable branch pipes and two manually operable valves 52 and 53. These two valves are always operated together, viz. in one sense to cause first the subsidiary rams 37 to descend, followed automatically by the descent of the main ram 29, and in the opposite sense to cause first retraction of the main ram followed by retraction of the two subsidiary rams.

In the control console there are provided immersion heaters at 54 and a water circulator pump, e.g. of the vane type, at 55. Mains water enters the console at 56 and the water system incorporates a multi-way control valve 57. Branch piping 58 extending to the inlet into the T bar 32 has incorporated therein a tap 59, and an outlet pipe 60 from the said T bar goes to the drain. One of the pipes, 61, extending from the valve 57 also extends to the drain. There is thus provided the means for circulating, at will, either cold or heated water both through the water jacket J of the flask 13 and the T bar 32.

The air line for the inflatable bag 46 is indicated at 62 and, as will be seen, incorporates an air pump 63 and an air pressure gauge 64.

If desired, means may also be provided for controlling the flow of molten bismuth alloy into the flask.

Furthermore, the bottom of the hollow original or master specimen 44 has formed in it fine holes 44a to enable molten bismuth alloy from the flask to fill the said original or master specimen. Upon solidification of the metal, the alloy in the holes 44a form sprues which automatically break when the press is opened.

Moreover, if drawn sheet-metal articles such as the radiator header tanks referred to are ultimately to be reproduced from an actual specimen having sharp inner and outer radii or other points where heavy working of the drawn metal will occur, it may be necessary or at least desirable in some instances to provide a set of small, accurately produced steel elements contoured to determine the desired radii or points, and to secure these elements in appropriate positions in or upon the original or master specimen, by means of a suitable adhesive, prior to the said specimen being immersed and located within the molten bismuth alloy in the flask.

The casting procedure is as follows:

First, the previously produced header tank 44 or similar article to be used as the original or master specimen and requiring to be reproduced is cleaned and generally prepared. Next, the flask 13 is filled, to within a short distance of its top edge, with molten bismuth alloy A, the alloy being melted by hot water at a sufficiently high temperature. Care is taken to ensure that the bag 4 is at least partially deflated at this stage. If, as may sometimes happen, the hydraulic press already has on it a pair of cast bismuth alloy press tools which were used during a previous manufacturing run, then naturally these tools will require first to be melted down before fresh tools can be cast in situ. This melting down process can be readily achieved by circulating hot water at an appropriately high temperature through the water jacket J of the flask and also through the T bar 32.

With the punch platen 31 and the blank holder 39 fully retracted and in their uppermost positions, as shown in FIGURES 2 and 3, a T bar 32 of suitable form and dimensions is attached to the punch platen, and the die face plate 43, with the free edge portion of the original or master specimen 44 secured within it by an adhesive, such as a resinous bonding material, is placed on top of the molten bismuth alloy in the flask 13 where it floats in the manner depicted in FIGURE 4. The original or master specimen 44 fills right to the top with molten alloy A which flows into it from the flask 13 through the aforementioned fine holes 44a. It is important, however, that the upper edge of the original or master specimen 44 shall initially project up just proud of the surface of the molten alloy in the flask 13 so that such alloy will not cover the said edge. To cover this upper edge would, of course, be fatal as it would preclude eventual satisfactory withdrawal of the original or master specimen from the solidified cast female press tool T'.

The manually operable valves 52 and 53 are next operated so that the blank holder 39 is first moved down (idly so far as the casting operation is concerned), whereupon, by downward plunge of the main ram 29, the punch platen 31 descends accurately to position the lower portion of the T bar 32 within the original or master specimen 44. This portion of the T bar 32, serving as the core of the male press tool being cast, is thus immersed in the molten bismuth alloy as shown in FIGURE 4. If necessary at this juncture, the precise level of the molten alloy A in the flask can be adjusted by admitting a little air into or letting air escape from the partially inflated bag 46.

By appropriate manipulation of the multi-way control valve 57, cooling water is next circulated through the T-bar 32. As a consequence a "frozen" or solidified crust C of the molten bismuth alloy A (FIGURE 4) is produced on top of the latter to provide a sealed lid at the top of the flask 13.

At the next stage, depicted in FIGURE 5, air is pumped into the bag 46 to fully inflate the same, thereby pressurising the cast, i.e. holding the molten alloy A up against the bottom and sides of the original or master specimen 44, compensating for shrinkage of the cooling alloy and preventing the formation of voids in the latter. At this stage, moreover, the valve 57 is operated to circulate cooling water through the water jacket J of the flask 13, the circulation of such water through the T bar 32 being meanwhile continued so that the initially molten alloy will be cooled downwards and inwards from the sides of the flask in a controlled manner.

Solidification proceeds until all the molten bismuth alloy is solid, whereupon the valves 52 and 53 are operated in the reverse manner to retract first the main ram 29 carrying with it the punch platen 31 and the in situ cast male press tool T (having the original or master specimen 44 still applied thereto), and then the subsidiary rams 37 to withdraw the blank holder 39. Thus, after the original or master specimen has been stripped from the male press tool T, all that is necessary to prepare the press for a manufacturing run is to bolt the appropriate blank holder plate 41 to the underside of the blank holder 39, as illustrated in FIGURE 6.

As will be appreciated, the complementary male and female tools T and T', being cast in situ on the press, will be correctly aligned in their working positions and are, therefore, immediately ready for use. When once a manufacturing run on the press has been completed, the said cast press tools can be melted down, the molten alloy then being ready for re-use in a fresh in situ casting operation.

If, instead of or in addition, to circulating cooling water through the T bar 32, it is desired to cause a fluid coolant, e.g. cold water, to flow directly over the surface of the molten bismuth alloy, so producing a glass-smooth surface on the frozen crust C, a scheme such as that illustrated in FIGURE 7 may be adopted. As will be seen, there is mounted upon the top edges of the outer shell of the flask 13 a shallow-walled, water-confining structure 65 which is open at the bottom. Along one side of this structure, which is rectangular in shape, is provided a water curtain inlet tube 66 whilst similarly arranged along the opposite side of the same structure is a water curtain outlet 67. Disposed in front of and right along the outlet 67 is an upstanding weir-like water trap 68, so that immediately after water passes over the upper edge 68a of this trap it will flow through the outlet 67 and into a drain.

Further, instead of using an inflatable bag 46 as shown in FIGURES 2–7, there may be provided in the flask an inverted receptacle 69 of rectangular configuration in plan and having an imperforate upper wall 70, the receptacle being formed around its lower edge with a series of apertures 71. There is also provided a connection 72 through which compressed air can be admitted to the upper part of the interior of said receptacle. Thus when cooling of the cast material commences, compressed air is admitted through said connection 72 to force molten material through said apertures 71 and thereby exert upward pressure on the material around the master specimen.

The mechanical properties of several tool materials can be improved by low temperatures, and in this regard it is within the scope of the invention to provide the press with any appropriate form of refrigeration or equivalent for cooling the cast press tools to a very low temperature. Furthermore, the invention can also be applied to the casting of tools which are made of nonmetallic materials.

Having thus described my invention what I claim as new and desire to secure by Letters Patent is:

1. A method of making complementary male and female press tools for the production, on a press, of articles drawn to shape from sheet material, said press having a movable platen and a stationary flask disposed below and in alignment with the platen, said method comprising the steps of securing to the movable platen, while this is retracted, an element adapted to form a core for the male press tool to be cast, supporting and locating within initially molten casting material contained in the flask a perforated master specimen of the article ultimately to be formed by repetition pressing on the same press, so that said master specimen becomes filled with such material, thereupon causing the platen to descend to the extent of immersing said core-forming element in the molten casting material then confined within the master specimen, cooling the molten casting material whilst maintaining it under pressure and until it solidifies, thereby producing an in situ cast male press tool which is keyed to said element and has exterior surface contours conforming with the interior wall contours of the master specimen and an in situ cast female press tool the complementary interior surface contours of which conform with the exterior contours of the said master specimen, retracting the platen and thereupon removing the master specimen from the cast male tool.

2. A method of making complementary male and female press tools for the production, on a press, of articles drawn to shape from sheet material, said press having a movable platen and a stationary flask disposed below and in alignment with the platen, said method comprising the steps of securing to the movable platen, while this is retracted, an element adapted to form a core for the male press tool to be cast, supporting and locating within initially molten casting material contained in the flask a perforated master specimen of the article ultimately to be formed by repetition pressing on the same press, so that said master specimen becomes filled with such material, thereupon causing the platen to descend to the extent of immersing said core-forming element in the molten casting material then confined within the master specimen, cooling the upper part of the molten material in the flask so as to produce on the latter a frozen crust providing a sealed lid on the top of the flask, and then pressurising the molten casting material remaining within the flask to exert upward pressure on the material around the master specimen, thereby producing an in situ cast male press tool which is keyed to said element and has exterior surface contours conforming with the interior wall contours of the master specimen and an in situ cast female press tool the complementary interior surface contours of which conform with the exterior contours of the said master specimen, retracting the platen and thereupon removing the master specimen from the case male tool.

3. A method of making complementary male and female press tools for the production, on a press, of articles drawn to shape from sheet material, said press having a movable platen and a stationary flask disposed below and in alignment with the platen, said method comprising the steps of securing to the movable platen, while this is retracted, an element adapted to form a core for the male press tool to be cast, supporting and locating within initially molten casting material contained in the flask a perforated master specimen of the article ultimately to be formed by repetition pressing on the same press, so that said master specimen becomes filled with such material, thereupon causing the platen to descend to the extent of immersing said core-forming element in the molten casting material then confined within the master specimen, cooling the upper part of the molten material in the flask so as to produce on the latter a frozen crust providing a sealed lid on the top of the flask, and then inflating an inflatable bag located in the bottom of the flask to exert upward pressure on the material around the master specimen, thereby producing an in situ cast male press tool which is keyed to said element and has exterior surface contours conforming with the interior wall contours of the master specimen and an in situ cast female press tool the complementary interior surface contours of which conform with the exterior contours of the said master specimen, retracting the platen and thereupon removing the master specimen from the cast male tool.

4. A method of making complementary male and female press tools for the production, on a press, of articles drawn to shape from sheet material, said press having a movable platen and a stationary flask disposed below and in alignment with the platen, said method comprising the steps of securing to the movable platen, while this is retracted, an element adapted to form a core for the male press tool to be cast, supporting and locating within initially molten casting material contained in the flask a perforated master specimen of the article ultimately to be formed by repetition pressing on the same press, so that said master specimen becomes filled with such material, thereupon causing the platen to descend to the extent of immersing said core-forming element in the molten casting material then confined within the master specimen, cooling the upper part of the molten material in the flask so as to produce on the latter a frozen crust providing a sealed lid on the top of the flask, and then admitting a pressurised fluid to the upper part of the interior of an inverted receptacle located in the bottom of the flask and having an imperforate upper wall and an apertured lower edge so as thereby to pressurise the molten casting material remaining within the flask to exert upward pressure on the material around the master specimen, thereby producing an in situ cast male press tool which is keyed to said element and has exterior surface contours conforming with the interior wall contours of the master specimen and an in situ cast female press tool the complementary interior surface contours of which conform with the exterior contours of the said master specimen, retracting the platen and thereupon removing the master specimen from the cast male tool.

5. A press for the production of articles drawn to shape from sheet material comprising in combination a bed, a flask fitted in said bed for containing molten casting material, means for heating and melting material in said flask and means for cooling molten material in the flask, a movable punch platen above and in alignment with the flask, said punch platen being adapted to carry a core-forming element of a male press tool, means adapted to carry a master specimen and locate said specimen within molten casting material in the flask, and means for pressurising the molten casting material remaining in the flask after cooling of said material has commenced.

6. A press for the production of articles drawn to shape from sheet material comprising in combination a bed, a flask fitted in said bed for containing molten casting material, means for heating and melting material in said flask and means for cooling molten material in the flask, a movable punch platen above and in alignment with the flask, said punch platen being adapted to carry a core-forming element of a male press tool, means adapted to carry a master specimen and locate said specimen within molten casting material in the flask, and an inflatable bag located at the bottom of the flask for pressurising the molten casting material remaining in the flask after cooling of said material has commenced.

7. A press for the production of articles drawn to shape from sheet material comprising in combination a bed, a flask fitted in said bed for containing molten casting material, means for heating and melting material in said flask and means for cooling molten material in the flask, a movable punch platen above and in alignment with the flask, said punch platen being adapted to carry a core-forming element of a male press tool, means adapted to carry a master specimen and locate said specimen within molten casting material in the flask, and an inverted receptacle having an imperforate upper wall and an apertured lower edge located at the bottom of the flask, said receptacle being adapted to be connected to a pressurised fluid for pressurising the molten casting material remaining in the flask after cooling of said material has commenced.

8. A press for the production of articles drawn to shape from sheet material comprising in combination a bed, a jacketed flask fitted in said bed for containing molten casting material, the jacket of said flask having an inlet and an outlet for circulating a heat transfer medium around the jacket, a movable punch platen above and in alignment with the flask, said punch platen being adapted to carry a core-forming element of a male press tool, means adapted to carry a master specimen and locate said specimen within molten casting material in the flask, and means for pressurising the molten casting material remaining in the flask after cooling of said material has commenced.

9. A press for the production of articles drawn to shape from sheet material comprising in combination a bed, a jacketed flask fitted in said bed for containing molten casting material, the jacket of said flask having an inlet and an outlet for circulating a heat transfer medium around the jacket, means mounted upon the top of the flask for causing a fluid coolant to flow directly over the surface of molten casting material in the flask, a movable punch platen above and in alignment with the flask, said punch platen being adapted to carry a core-forming element of a male press tool, means adapted to carry a master specimen and locate said specimen within molten casting material in the flask, and means for pressurising the molten casting material remaining in the flask after cooling of said material has commenced.

References Cited by the Examiner

UNITED STATES PATENTS 639,096   12/1899   Sagendorf.
2,302,764   11/1942   Greaves-Walker _____ 25—121

FOREIGN PATENTS 670,639   4/1952   Great Britain.

J. SPENCER OVERHOLSER, Primary Examiner.

R. S. ANNEAR, Assistant Examiner.